June 2, 1936.   E. J. KUCKUCK   2,042,789

COLLAPSIBLE CONTROL LEVER FOR AGRICULTURAL IMPLEMENTS

Filed Aug. 26, 1935

Inventor
Emil J. Kuckuck

By Clarence A. O'Brien
Attorney

Patented June 2, 1936

2,042,789

UNITED STATES PATENT OFFICE 2,042,789

COLLAPSIBLE CONTROL LEVER FOR AGRICULTURAL IMPLEMENTS

Emil J. Kuckuck, Pleasant Lake, Ind.

Application August 26, 1935, Serial No. 37,969

1 Claim. (Cl. 55—103)

This invention appertains to new and useful improvements in agricultural implements and more particularly to a novel control whereby the ground engaging elements thereof are adjusted.

The principal object of the present invention is to provide a control lever for adjusting ground engaging elements wherein the control lever can be swung to a position reclining to such an extent that the implement can be stored in a very limited space.

Other important objects and advantages of the invention will become apparent to the reader of the following specification.

Figure 1:
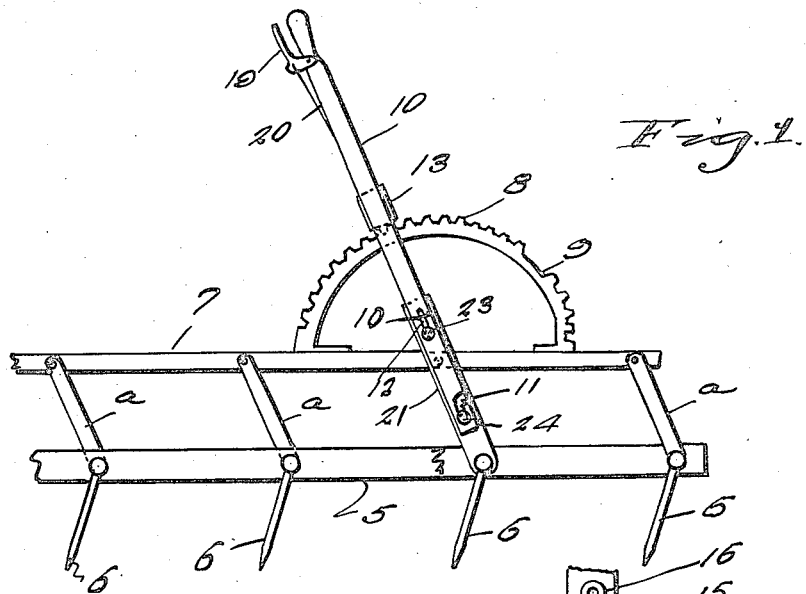
Figure 1 represents a fragmentary side elevational view of an agricultural implement with the improved control thereon in useful position.

Referring to the drawing wherein like numerals designate like parts, it can be seen that Figure 1 shows the usual tooth bar 5 on which teeth 6 are rockable, while numeral 7 represents the tie rod for connecting the upper end of the teeth or the shanks of the teeth in the manner shown. The semicircular rack 8 is mounted on the tie rod 7 and adjacent one end of the rod several teeth are eliminated to form the pocket or depression 9.

Numeral 10 represents the hand lever for controlling the tooth bar 5, this lever 10 being provided with a bayonet slot 11 at its lower end and an elongated slot 12 at an intermediate point. A protuberance or boss 13 above the slot 12 has an opening therein through which the detent 14, cooperative with the teeth of the rack 8 is slidable. A lug 15 on the lever 10 is located adjacent the boss 13 and through which the detent 14 also slides and is provided with an eyelet 16 above the same. A collar 17 on the detent 14 has a coiled compressible spring 18 interposed between the same and the lug 15 for normally urging the said detent 14 in a downward direction. A pivotal hand grip 19 is located at the upper end of the lever 10 and a wire connection 20 is made between this and the eyelet 16 of the detent 14.

The lever 10 is provided with a shank 21 which is simply a substitute for one of the tooth shanks $a$, the same being pivotally connected to the tie rod 7 as at 22 and having a portion of the same projecting upwardly above the tie rod 7 wherein stud 23 projects from and through the slot 12 in the lever 10. The member 21 is also provided with a stud 24 at an intermediate point over which the bayonet slotted end 11 of the lever 10 engages and sets within the longitudinal portion.

It can now be seen that when the detent 14 is engaged with the teeth of the rack 8 the lever 10 is maintained elevated to such an extent that the stud 24 will be located in the longitudinal portion of the bayonet slot 11, thus holding the lever rigid with respect to the link 21.

Figure 2:
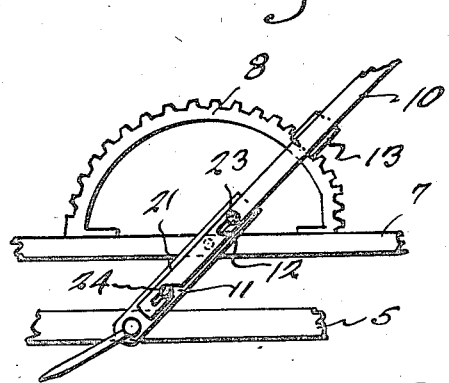
Figure 2 represents a fragmentary side elevational view of an agricultural implement showing the control lever moved to a position from which it can be swung to a collapsed position.
Figure 4:
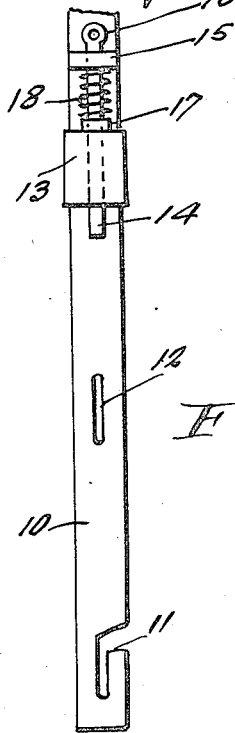
Figure 4 represents a fragmentary side elevational view of the novel control lever showing the opposite side from that shown in Figures 1, 2, and 3.
Figure 3:
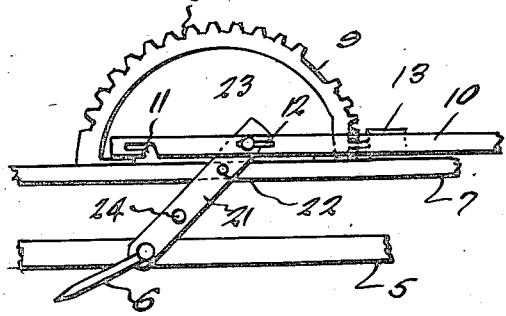
Figure 3 represents a side elevational view of an agricultural implement showing the control lever swung to collapsed position.

However, when the detent 14 is moved to a position so that the boss 13 sinks into the recess 9, the lever will drop and result in the registering of the stud 24 with the outlet of the bayonet slot 11. With the lever thus dropped and the bayonet slotted portion of the lever in this position with respect to the stud 24, the lever can be swung from the position shown in Figure 2, to the collapsed position shown in Figure 3. Thus the agricultural implement can be placed in a space of very limited depth.

While the foregoing specification sets forth the invention in specific terms it is to be understood that numerous changes in the shape, size and materials may be resorted to without departing from the spirit and scope of the invention as claimed hereinafter.

Having thus described the invention, what is claimed as new is:

In an agricultural machine, a tooth bar, a tie rod, teeth rockable on the tooth bar and provided with shanks pivotally connected to the said tie rod, a hand lever provided with a detent thereon, a link member pivotally connected to the tooth bar and tie rod and provided with a pair of spaced studs thereon, an arcuate rack mounted on the tie rod and provided with a pocket at one end thereof, said hand lever being provided with a protuberance for riding engagement with the teeth of the rack, said hand lever being provided with a slot for receiving one of the studs, said lever being provided with a bayonet slot for detachably receiving the other stud, said last mentioned stud being disengageable from the hand lever when the protuberance drops into the said pocket.

EMIL J. KUCKUCK.